United States Patent
Max

(10) Patent No.: US 6,890,444 B1
(45) Date of Patent: **\*May 10, 2005**

(54) HYDRATE FORMATION AND GROWTH FOR HYDRATE-BASED DESALINATION BY MEANS OF ENRICHING WATER TO BE TREATED

(75) Inventor: Michael D. Max, Washington, DC (US)

(73) Assignee: Marine Desalination Systems, L.L.C., Washington, DC (US)

( * ) Notice: Subject to any disclaimer, the term of this patent is extended or adjusted under 35 U.S.C. 154(b) by 78 days.

This patent is subject to a terminal disclaimer.

(21) Appl. No.: 10/402,940

(22) Filed: Apr. 1, 2003

(51) Int. Cl.$^7$ .................................................. C02F 1/00
(52) U.S. Cl. .......................... 210/737; 62/123; 62/532; 203/10; 210/738; 210/747; 210/774; 210/170; 210/177; 210/181; 210/199; 210/202; 210/205; 585/15
(58) Field of Search .......................... 62/532, 533, 123, 62/238.5, 239, 240; 203/10; 210/702, 737, 726, 747, 749, 752, 766, 774, 170, 177, 181, 182, 195.1, 202, 205, 738, 199

(56) References Cited

U.S. PATENT DOCUMENTS

| | | |
|---|---|---|
| 135,001 A | 1/1873 | Meylert |
| 2,904,511 A | 9/1959 | Donath |
| 2,974,102 A | 3/1961 | Williams |
| 3,027,320 A | 3/1962 | Buchanan |
| 3,119,771 A | 1/1964 | Cottle |
| 3,119,772 A | 1/1964 | Hess et al. |
| 3,126,334 A | 3/1964 | Harlow |
| 3,132,096 A | 5/1964 | Walton |
| 3,148,143 A | 9/1964 | Donath |
| 3,155,610 A | 11/1964 | Williams |
| 3,171,727 A | 3/1965 | Brown et al. |

(Continued)

FOREIGN PATENT DOCUMENTS

| | | |
|---|---|---|
| GB | 1 320 134 GB | 6/1973 |
| JP | 55055125 | 4/1980 |
| JP | 58109179 | 6/1983 |
| JP | 59029078 | 2/1984 |
| JP | 61025682 | 2/1986 |
| JP | 11319805 | 11/1999 |
| JP | 2000202444 | 7/2000 |
| RU | SU997715 | 2/1983 |
| RU | SU1006378 | 3/1983 |
| WO | WO 01/04056 | 1/2001 |
| WO | WO01/34267 A1 | 5/2001 |

OTHER PUBLICATIONS

EPO—Patent Abstracts of Japan, Publication No. 61136481, Publication date Jun. 24, 1986, Muneschichi, Concentration of Aqueous Solution English language abstract.

(Continued)

*Primary Examiner*—Peter A. Hruskoci
(74) *Attorney, Agent, or Firm*—Kenneth M. Fagin, Esq.

(57) ABSTRACT

Water to be desalinated or otherwise purified is enriched by having hydrate-forming substance dissolved into it, without causing hydrate to form. Hydrate kernels are brought into contact with the enriched water to be treated, and the hydrate kernels grow outwardly into the water to be treated by incorporating dissolved molecules of the hydrate-forming substance and water from the water to be treated. Thus, substantially solid, generally spherical hydrate masses, which are preferred for hydrate-based desalination or purification, can be formed. Hydrate-forming substances can be dissolved into the water to be treated under conditions not conducive to formation of hydrate, such that hydrate does not form, using vigorous means. Hydrate-forming substance is also preferably dissolved into the water to be treated under conditions suitable for hydrate to form, but without causing hydrate to form, e.g., by being infused into the water to be treated using infusion membranes.

26 Claims, 5 Drawing Sheets

U.S. PATENT DOCUMENTS

| | | |
|---|---|---|
| 3,214,371 A | 10/1965 | Tuwiner |
| 3,217,505 A | 11/1965 | Tuwiner |
| 3,243,966 A | 4/1966 | Glew |
| 3,308,063 A | 3/1967 | Hess et al. |
| 3,350,299 A | 10/1967 | Hess et al. |
| 3,350,300 A | 10/1967 | Hess et al. |
| 3,371,035 A | 2/1968 | Jacobs et al. |
| 3,675,436 A | 7/1972 | Ganiaris |
| 3,712,075 A | 1/1973 | Smith et al. |
| 3,813,892 A | 6/1974 | Johnson |
| 3,856,492 A | 12/1974 | Klass |
| 3,892,103 A | 7/1975 | Antonelli |
| 3,983,032 A | 9/1976 | Hess et al. |
| 3,992,170 A | 11/1976 | Karnofsky |
| 4,170,328 A | 10/1979 | Kirk et al. |
| 4,207,351 A | 6/1980 | Davies |
| 4,267,022 A | 5/1981 | Pitcher .................. 203/100 |
| 4,272,383 A | 6/1981 | McGrew |
| 4,278,645 A | 7/1981 | Filss |
| 4,376,462 A | 3/1983 | Elliott et al. ................ 166/267 |
| 4,392,959 A | 7/1983 | Coillet |
| 4,424,858 A | 1/1984 | Elliott et al. .................. 166/52 |
| 4,643,832 A | 2/1987 | Iniotakis et al. |
| 4,652,375 A | 3/1987 | Heilweil et al. |
| 4,670,159 A | 6/1987 | Garrett et al. |
| 4,678,583 A | 7/1987 | Wilson, III et al. |
| 4,686,833 A | 8/1987 | Hino et al. |
| 4,696,338 A | 9/1987 | Jensen et al. |
| 4,718,242 A | 1/1988 | Yamauchi et al. |
| 4,767,527 A | 8/1988 | Iniotakis et al. |
| 4,821,794 A | 4/1989 | Tsai et al. |
| 5,037,555 A | 8/1991 | Pasternak et al. |
| 5,055,178 A | 10/1991 | Sugier et al. |
| 5,076,934 A | 12/1991 | Fenton |
| 5,110,479 A | 5/1992 | Frommer et al. |
| 5,128,042 A | 7/1992 | Fenton |
| 5,159,971 A | 11/1992 | Li |
| 5,167,838 A | 12/1992 | Wilensky |
| 5,304,356 A | 4/1994 | Iijima et al. |
| 5,362,467 A | 11/1994 | Sakai et al. |
| 5,364,611 A | 11/1994 | Iijima et al. |
| 5,397,553 A | 3/1995 | Spencer et al. |
| 5,444,986 A | 8/1995 | Hino |
| 5,448,892 A | 9/1995 | Cheng |
| 5,473,904 A | 12/1995 | Guo et al. |
| 5,497,630 A | 3/1996 | Stein et al. |
| 5,512,176 A | 4/1996 | Blair |
| 5,553,456 A | 9/1996 | McCormack |
| 5,562,891 A | 10/1996 | Spencer et al. |
| 5,660,603 A | 8/1997 | Elliot et al. |
| 5,679,254 A | 10/1997 | Chakrabarti |
| 5,816,057 A | 10/1998 | Dickey et al. |
| 5,873,262 A | 2/1999 | Max et al. |
| 6,028,234 A | 2/2000 | Heinemann et al. |
| 6,089,022 A | 7/2000 | Zednik et al. |
| 6,106,595 A | 8/2000 | Spencer |
| 6,112,528 A | 9/2000 | Rigby |
| 6,158,239 A | 12/2000 | Max et al. |
| 6,180,843 B1 | 1/2001 | Heinemann et al. |
| 6,245,955 B1 | 6/2001 | Smith |
| 6,296,060 B1 | 10/2001 | McCaslin |
| 6,531,034 B1 * | 3/2003 | Max ........................ 203/10 |
| 6,562,234 B2 * | 5/2003 | Max ........................ 210/170 |
| 6,673,249 B2 * | 1/2004 | Max ........................ 210/747 |
| 6,767,471 B2 * | 7/2004 | Max ........................ 210/702 |

OTHER PUBLICATIONS

Japanese Abstract, Journal No.: G0941AAK ISSN No.: 0453–0683, 1995, vol. 42, No. 7. Accession No.: 95A0492545, File segment: JICST–E.

Max and Chandra, "The Dynamic Oceanic Hydrate System: Production Constraints and Strategies," Offshore Technology Conference, Paper No. 8684, pp. 1–10 (1998).

Max and Dillon, "Oceanic Methane Hydrate: The Character of the Blake Ridge Hydrate Stability Zone, and the Potential for Methane Extraction," *Journal of Petroleum Geology*, vol. 21(3), Jul. 1998, pp. 343–357.

Max, M.D., "Oceanic Methane Hydrate: The Character of the Blake Ridge Hydrate Stability Zone, and the Potential for Methane Extraction," Author's correction, *Journal of Petroleum Geology*, vol. 22(2), pp. 227–228 (Apr. 1999).

Max and Lowrie "Oceanic Methane Hydrate Development: Reservoir Character and Extraction," *Naval Research Laboratory* (NRL), OTC 8300, pp. 235–240.

Max and Lowrie, "Oceanic Methane Hydrates; A "Frontier" Gas Resource", *Journal of Petroleum Geology*, vol. 19(a), pp. 41–56 (Jan. 1996).

Max et al., "Extraction of Methane from Oceanic Hydrate System Deposits", Offshore Technology Conference, Paper No. 10727, pp. 1–8 (1999).

Max et al., "Methane–Hydrate, A Special Clathrate: Its Attributes and Potential," *Naval Research Laboratory*, NRL/MR/6101–97–7926, pp. 1–74 (Feb. 28, 1997).

Mel'nikov et al. Russian Abstract Publication No. 2166348, May 10, 2001.

Rautenbach et al., Entwicklung und Optimierung eines Hydrat–Verfahrens zur Meerwasserentsalzung, Chemie–Ing.–Techn 45 jahrg. 1973/Nr. 5, pp. 259–254.

Seliber, Methane Cooled Desalination Method and Apparatus, USPTO, Defensive Publication T939, 007—Published Oct. 7, 1975.

XP–00213497 SU1328298 English language abstract.

U.S. Appl. No. 09/941,545, filed Aug. 30, 2001, Max.

U.S. Appl. No. 10/686,743, filed Oct. 17, 2003, Max.

* cited by examiner

HYDRATE FORMATION AND GROWTH FOR HYDRATE-BASED DESALINATION BY MEANS OF ENRICHING WATER TO BE TREATED

GOVERNMENTAL SUPPORT AND INTEREST

This invention was made with Governmental support under Contract No. NBCHC 010003 dated Jan. 29, 2001 and issued by the Department of the Interior—National Business Center (DARPA). The Government has certain rights in the invention.

FIELD OF THE INVENTION

In general, the invention relates to improved techniques for growing hydrate—particularly for use in hydrate-based desalination. More particularly, the invention relates to advanced methods for preparing water to be treated by dissolving hydrate-forming agent into the water to be treated.

BACKGROUND OF THE INVENTION

In hydrate-based or clathrate-based desalination (referred to herein simply as "hydrate-based desalination"), fresh water is "extracted" from saline or brackish water by forming hydrate in the saline or brackish water, gathering the hydrate, and allowing it to dissociate to release the fresh water and the hydrate-forming substance (which may be introduced to the water to be treated as a liquid or, more preferably, as a gas). Although hydrate-based desalination has been known conceptually since as early as the late 1950's, it is believed that, to date, it has not been possible to conduct hydrate-based desalination on a commercially viable basis, i.e., in a manner that produces water of potable quality over sustained periods of time at volumetric rates sufficient to justify the construction of a commercial-scale installation.

As far as I know, according to previous methods, the hydrate-forming substance (e.g., gas) has been simply injected into the water to be treated in relatively uncontrolled fashion, e.g., as bubbles. When the hydrate-forming substance is so injected into the water to be treated under appropriate hydrate-forming conditions, hydrate quickly nucleates on the bubbles and grows to form a thin shell of hydrate around the bubble. Growth ceases, however, when the hydrate shell reaches a thickness on the order of five or ten to twenty microns, thus effectively separating the bubble of hydrate-forming substance from the surrounding water to be treated. At that point, further hydrate growth, if any, becomes dependent on the much slower, inefficient process of gas or water diffusion through the hydrate shell.

The hydrate shells do tend to fracture, however. In particular, they can fracture due to colliding with each other in the turbulent motion of the water to be treated as hydrate-forming substance is injected (particularly where it is injected in liquid phase and the hydrate-forming substance spontaneously and violently changes to its gas phase). Additionally, the bubbles may fracture as positively buoyant hydrate-encrusted bubbles of hydrate-forming substance (particularly gas) rise through the water column into regions of reduced ambient pressure, where the hydrate-forming substance can expand and fracture the hydrate shells. (In the case of shells formed from negatively buoyant hydrate, the shell-encrusted bubbles may sink to regions of increased ambient pressure and fracture due to that increased pressure.) As a result, what is obtained is essentially a slurry of thin fragments of hydrate shells, and that result is undesirable for a number of reasons.

First, where the hydrate forms a slurry of shell fragments, the slurry traps or carries a large amount of residual brine of elevated salinity in the interstitial spaces between the shell fragments. That residual brine is difficult to expel completely using a washing process and mixes with the fresh water released by the hydrate as it dissociates, thus raising the salinity of the product water to levels that may prevent it from being potable.

Second, I have recognized that in order to maximize the amount of fresh water actually recovered from a given mass of hydrate, as much of the hydrate as possible should dissociate near the point of fresh water collection. Because hydrate dissociation is a surface event or phenomenon—in other words, hydrate dissociates or decomposes from its surface inwardly, in contrast to the whole mass of hydrate breaking apart when it moves into a region where it is no longer stable—I have recognized that it is important to minimize the ratio of hydrate surface area to hydrate mass in order to obtain as much fresh water as possible from a given mass of hydrate. When the product hydrate exists largely in the form of a slurry of shell fragments, the hydrate surface area is quite high relative to the hydrate mass. As a result, the hydrate begins to dissociate long before it can be removed to an ideal dissociation location, e.g., typically in a region where much contaminating residual brine is present. Additionally, the hydrate tends to dissociate at a rate that is too high for the process to be well controlled or to be able to recover as much fresh water as possible.

Additionally, some of my earlier work relating to using positively buoyant hydrate for the desalination process has relied on or taught using the natural buoyancy of the hydrate to collect it by simply allowing the hydrate to float upward into a region where it is no longer stable, at which point the hydrate dissociates to release fresh water and the hydrate-forming substance. When the hydrate is in the form of small shell fragments or shards, however, the amount of fluid drag on the hydrate may be so great that buoyant upward movement of hydrate is retarded or even prevented if relative flow and hydrate formation rates are not controlled properly. In such a situation, the slurry of hydrate shells and residual brines would separate from each other only over long periods of time, which would make hydrate-based desalination impractical, or by using mechanical means such as centrifugal dewatering, which would make the process complex and more expensive.

I believe that these factors have inhibited the use of hydrate-based desalination on a commercial basis, i.e., on a continuous basis and/or on a large enough scale to provide fresh water for a whole community.

SUMMARY OF THE INVENTION

The present invention extends the concepts disclosed in commonly assigned provisional U.S. patent application Ser. No. 60/240,986 filed Oct. 18, 2000; non-provisional U.S. patent application Ser. No. 09/941,545 filed Aug. 30, 2001 (publication number 20020003111); and PCT application number PCT/US01/27720 filed Sep. 7, 2001 (publication number WO 02/20410 A1), the contents of each of which are incorporated by reference. In doing so, the invention capitalizes on a recently discovered phenomenon, namely, that introducing hydrate into a gas/water system containing a hydrate-forming gas dissolved therein will lower the saturation point of the system in the vicinity of the introduced hydrate such that, depending on initial gas concentration and pressure and temperature conditions, the local system can, very quickly, be rendered supersaturated by the presence of the hydrate. As a result, molecules of the hydrate-forming substance will be induced to be incorporated rapidly into the hydrate mass causing such supersaturation. Thus, by providing a system in which hydrate is present within a field of water to be treated that has had hydrate-forming substance dissolved in it, initial hydrate "kernels" can be grown outwardly into the surrounding water space to form relatively large, solid hydrate masses on the order of several centimeters across or larger. Such hydrate masses, which tend to be rounded or generally ball-shaped, minimize or prevent the difficulties explained above that can occur when the hydrate forms essentially a slurry of fractured shells.

Additionally, enriching the water to be treated with hydrate-forming substance fosters the formation of hydrate shells on bubbles of gaseous hydrate-forming substance as the initial hydrate kernels are formed. In other words, the presence of hydrate-forming substance already dissolved in the water to be treated facilitates nucleation of the hydrate shells because less hydrate-forming substance will have to dissolve from the injected gas bubble into the surrounding water for hydrate nucleation to occur.

As a result, the invention significantly advances the commercial-scale prospects for hydrate-based desalination.

Preferably, hydrate-forming substance is introduced into the water to be treated at multiple locations, and it can be introduced in different ways depending on where it is introduced. In particular, some hydrate-forming substance is mixed with the water to be treated at what may be referred to as a "substantially upstream" location. That is a location where pressure and temperature conditions (pressure conditions, in particular) are not suitable for hydrate to form. Therefore, the hydrate can be introduced in an extremely vigorous manner, such that as much hydrate-forming substance is dissolved into the water to be treated in as quick a manner as possible.

More hydrate-forming substance is introduced at what may be referred to as a "somewhat upstream" location. That is a location where conditions are such that hydrate would be stable if it formed, but which is upstream of the hydrate formation region (the region where it is intended for hydrate to form). Hydrate is not intended to be formed at the somewhat upstream location. In order to avoid forming hydrate in the inflowing water to be treated at somewhat upstream locations, the hydrate-forming substance is introduced in a careful, non-energetic manner. To that end, the hydrate-forming substance preferably is infused into the water on a molecular basis.

Still further hydrate-forming substance is preferably dissolved into the water to be treated at a "co-located" location. That is a location that is approximately right at or generally within the hydrate formation region, or even slightly below it assuming downward overall system flow. As is the case for the somewhat upstream locations, the hydrate-forming substance is introduced into the water to be treated at such co-located locations in a careful, non-energetic manner, e.g., by being infused into the water on a molecular basis.

In addition to capitalizing on and extending the concepts disclosed in the above-referenced patent applications, the invention also utilizes to significant advantage the system flow characteristics taught in commonly assigned provisional U.S. patent application Ser. No. 60/230,790 filed Sep. 7, 2000, the contents of which are incorporated by reference, as well as the above-referenced and incorporated non-provisional U.S. patent application Ser. No. 09/941,545 and PCT application number PCT/US01/27720. In particular, assuming positively buoyant hydrate is to be used for desalination, water to be treated containing hydrate-forming substance dissolved in it is introduced into the hydrate formation region of a desalination installation above a point at which hydrate is actually caused to nucleate (by injecting the hydrate-forming substance into the water to be treated in relatively turbulent, energetic fashion). Overall flow through the system is controlled such that residual brine exits the system from below the point of hydrate formation, carrying heat of exothermic hydrate formation with it. Meanwhile, hydrate will be rising up through the downwardly flowing water due to the hydrate's inherent buoyancy, in an essentially counter-flow pattern. By so controlling the system flow pattern, the residence time of the hydrate within the field of hydrate-forming-substance-containing water to be treated is increased. This increases the duration of exposure of the hydrate to the dissolved hydrate-forming substance and hence, by virtue of the saturation point phenomenon noted above, the amount of hydrate growth that can be achieved.

Thus, in a first aspect, the invention features a method for desalinating or purifying saline or otherwise polluted water to be treated using hydrate to do so. The method entails actively or directly forming hydrate of a hydrate-forming substance in a hydrate formation region of a desalination or purification installation under pressure and temperature conditions conducive to formation of the hydrate, and then dissociating the hydrate to release and recover fresh water that has been extracted from the water to be treated. Hydrate-forming substance is dissolved into the water to be treated in a manner which does not cause hydrate to form so as to form water to be treated that is enriched in hydrate-forming substance, and masses or kernels of hydrate are formed in the hydrate formation region. The kernels of hydrate are exposed to the enriched water to be treated and, hence, grow outwardly into the surrounding water to be treated by incorporating into the hydrate structure, from the water to be treated, fresh water and molecules of the hydrate-forming substance that have been dissolved into the water to be treated.

Preferably, hydrate-forming substance is dissolved into the water to be treated at a substantially upstream location, which is at pressure and temperature conditions which do not support hydrate formation, in a relatively energetic manner. The hydrate-forming substance can be dissolved into the water to be treated at the substantially upstream location to the point of saturation or even supersaturation. Additionally, hydrate forming substance is also preferably dissolved into the water to be treated at a somewhat upstream location, where pressure and temperature conditions do support hydrate formation but which is upstream of the hydrate formation region, and/or at a co-located location, which is generally at or somewhat below the hydrate formation region. In the somewhat upstream location and/or co-located location, hydrate-forming substance is dissolved into the water to be treated in relatively gentle fashion, e.g., on a molecular basis by means of infusion membranes, to concentrations that are below the point of saturation so as to avoid forming hydrate from the infused hydrate-forming substance.

In another aspect, the invention features an installation for desalinating or purifying saline or otherwise polluted water to be treated using hydrate to do so by 1) actively or directly forming hydrate of a hydrate-forming substance in a hydrate formation region of the installation under pressure and temperature conditions conducive to formation of the hydrate; and then 2) dissociating the hydrate to release and recover fresh water that has been extracted from the water to be treated. The installation includes a hydrate formation region configured to receive water to be treated under pressure conditions suitable for forming hydrate of the hydrate-forming substance; a substantially upstream hydrate-forming substance dissolving device that is disposed relative to the hydrate formation region at a substantially upstream location, where pressure conditions are not suitable for hydrate to form; and at least one of (a) a somewhat upstream hydrate-forming substance dissolving device that is disposed relative to the hydrate formation region at a somewhat upstream location where pressure conditions are suitable for hydrate to form and (b) a co-located hydrate-forming substance dissolving device that is disposed at a co-located location approximately right at the hydrate formation region or slightly below it.

BRIEF DESCRIPTION OF THE DRAWINGS

The invention will now be described in greater detail in connection with the drawings, in which.

DETAILED DESCRIPTION OF EMBODIMENTS OF THE INVENTION

Figure 1:
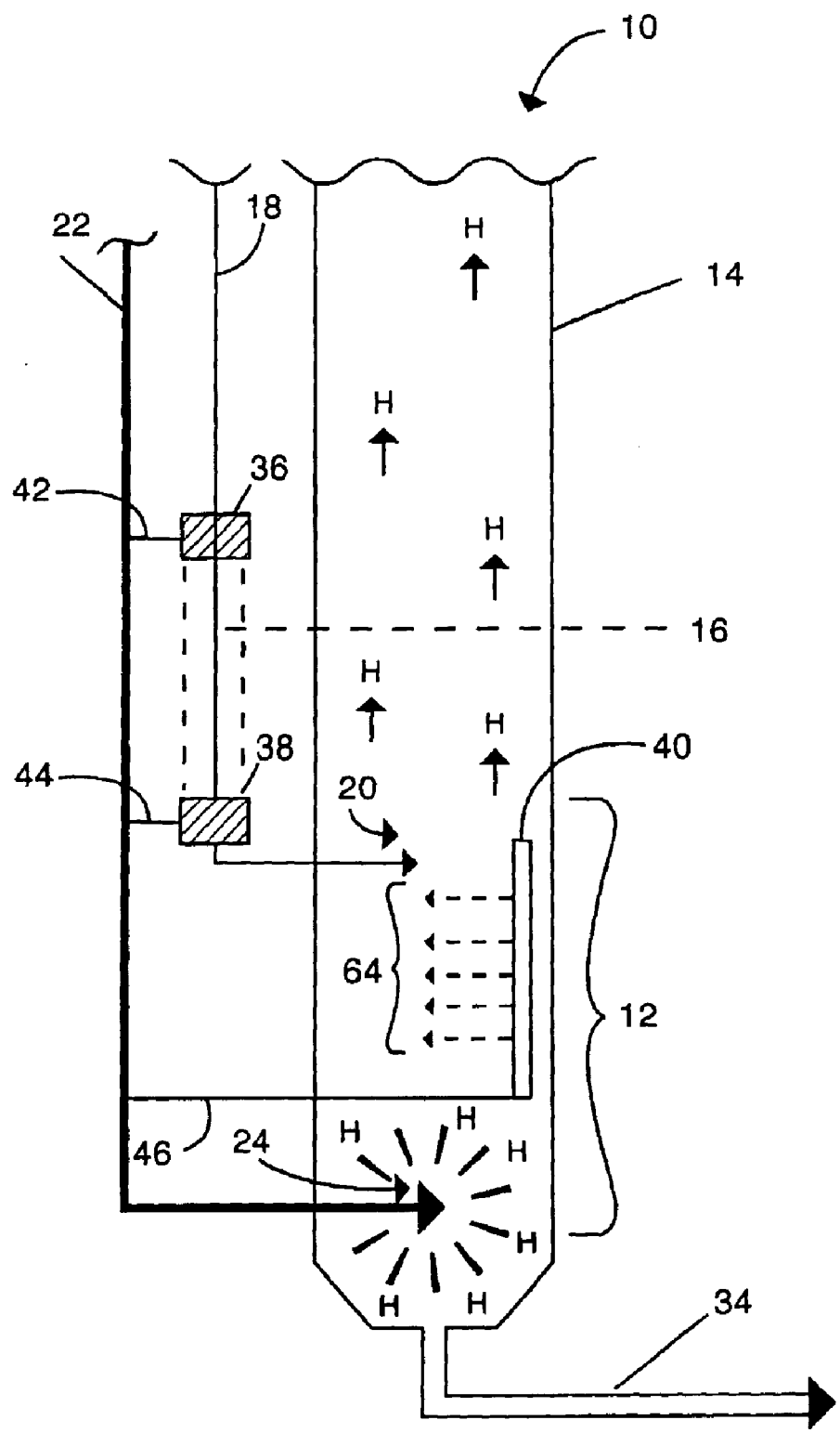
FIG. 1 is a schematic section view illustrating the hydrate formation region portion of an in-land shaft-based installation utilizing the present invention.

The lower portion of an apparatus or installation 10 for practicing the invention is illustrated in FIG. 1. In particular, FIG. 1 illustrates the lower, hydrate-formation region 12 of a shaft 14 that has been constructed extending down into the ground to sufficient depth for the weight of water located in the hydrate formation region 12 to generate the levels of pressure necessary for hydrate to form and remain stable. In general, positively buoyant hydrate H is caused to form within the hydrate formation region 12 and, due to its inherent buoyancy, rises up through the column of water contained within the shaft 14 into a hydrate dissociation region (not shown). The hydrate dissociation region is well above the pressure depth 16 below which the hydrate remains stable, and therefore, the hydrate dissociates within the hydrate dissociation region. As the hydrate dissociates, it releases fresh water that has been extracted from the water to be treated and the hydrate-forming substance from which it is made. Such overall or general operating principles and other further operating principles are disclosed, for example, in my previous U.S. Pat. Nos. 6,475,460, 6,497,794, and 6,531,034, the contents of which are incorporated by reference. It is also contemplated that the methods of the present invention may be implemented in apparatus for hydrate-based desalination which rely on mechanical or artificial pressurization to generate the necessary hydrate-forming pressures, as also disclosed in those three patents, or to augment the pressures that are generated by the weight of the column of water in the shaft where the shaft cannot be constructed deep enough to generate the required pressures. Such mechanical pressure augmentation is disclosed, for example, in my U.S. patent application Ser. No. 10/019,691, the contents of which are also incorporated by reference.

According to the present invention, water to be treated flows through water input conduit 18 and enters the hydrate formation region 12 at water input location or locations 20. A suitable hydrate-forming substance such as (but not limited to) any one of the common hydrocarbon gases (methane, ethane, propane, butane, or a mixture thereof), carbon dioxide, chlorine, etc. is pumped through hydrate-forming substance input conduit 22 and is injected into the water to be treated at hydrate-forming substance injection location 24. The hydrate-forming substance is injected in a relatively robust or energetic manner such that hydrate H spontaneously forms or nucleates. Both the water to be treated and the hydrate-forming substance may have multiple injection points to facilitate complex circulation patterns of the water to be treated within the hydrate formation region 12, thereby optimizing the residence time of hydrate within the hydrate formation region 12.

Figure 2:
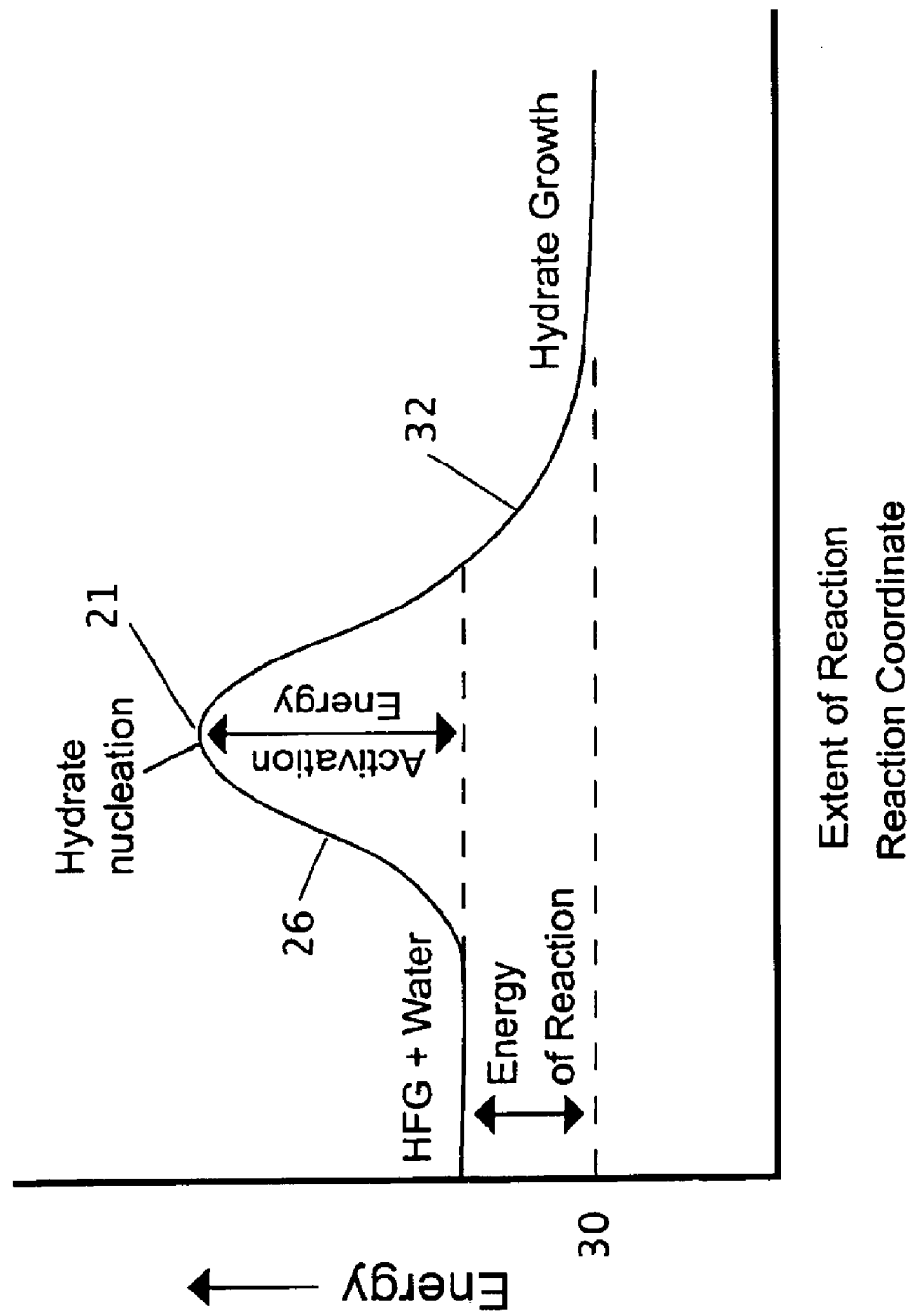
FIG. 2 is a schematic diagram illustrating the relative energy associated with hydrate formation and growth.

As illustrated in FIG. 2, hydrate nucleation is an energy-dependent phenomenon. As shown by the portion of the curve 26 that is to the left of the peak 28 in FIG. 2, the amount of energy required to be input into a system to achieve hydrate formation increases with the degree of transformation of the system toward hydrate crystallization, up to the point at which hydrate actually forms as represented by the peak 28. Once nucleation has been initiated, further hydrate growth will occur and continue automatically (provided sufficient water and hydrate-forming substance are provided), and the energy associated with that further growth decreases from the peak 28 to a relatively constant energy level 30, as shown by the growth portion of the curve 32 that is to the right of the 28.

FIG. 2 also reveals the exothermic nature of the hydrate formation process, as energy is shed as the hydrate nucleates and grows along the growth portion 32 of the curve. As the hydrate forms, it releases energy in the form of heat, which warms the surrounding residual brine. Flow through the system is controlled so that the residual brine flows downward and out through brine removal conduit 34 (FIG. 1), thus removing heat from the system. Due to its inherent buoyancy, the hydrate H will rise through the column into the dissociation region (not shown), as noted above.

As further shown in FIG. 1, the installation 10 includes hydrate-forming substance dissolving devices 36, 38, and 40, which cause hydrate-forming substance to be dissolved into the water to be treated. The hydrate-forming substance dissolving device 36 is located at a substantially upstream location, above the pressure depth 16 below which hydrate forms and remains stable, whereas the hydrate-forming dissolving devices 38 and 40 are located below that pressure depth 16. Moreover, the hydrate-forming substance dissolving device 40 is located within the hydrate formation region 12 itself.

The hydrate-forming substance dissolving devices 36 and 38 are situated along or form part of the water input conduit 18 such that inflowing water to be treated flows through each of the hydrate-forming substance dissolving devices 36 and 38 on its way to the hydrate formation region 12. Each of the hydrate-forming substance dissolving devices 36, 38, and 40 is provided with hydrate-forming substance by means of feeder lines 42, 44, and 46, respectively, branching off from the hydrate-forming substance input conduit 22. Alternatively, in order to provide greater system flexibility (e.g., by adding different hydrate-forming substances or mixes of substances to the system at different locations), multiple, independent gas supply conduits may be used, with separate gas supply conduits being used to supply hydrate-forming gas to each dissolving device separately and/or to the point of injection 24.

According to the invention, hydrate-forming substance is dissolved into the water to be treated by means of the dissolving devices before hydrate is actually formed. Therefore, when hydrate is formed in the hydrate formation region 12, it will be immersed in an environment rich in hydrate-forming substance. Because the presence of the hydrate in the water/gas system causes the gas saturation point to drop, which is a recently discovered phenomenon addressed more fully below, molecules of the hydrate-forming substance that were dissolved in the water to be treated will tend toward coming out of solution and quickly be incorporated into the hydrate structure. Accordingly, the hydrate will grow radially outwardly into the surrounding water column, increasing in size and mass from the original kernels of hydrate that were formed upon injection of hydrate-forming substance into the water to be treated at injection point 24 up to relatively large, solid, rounded or ball-shaped hydrate masses. This is in sharp contrast to forming simple hydrate-encrusted bubbles of hydrate-forming substance, which will fracture and cause the difficulties explained above.

With respect to the ultimate size of the hydrate masses which is desired, a certain amount of trade-off is required. Although the optimal amount of fresh water that can be recovered from a given mass of hydrate will be recovered from hydrate that has as little total surface area as possible, and that would lead one to want to form hydrate masses that are as large as theoretically or stoichiometrically possible for a given amount of hydrate-forming substance, doing so would itself have drawbacks. In particular, because dissociation is a surface phenomenon, the larger the hydrate masses are (and the smaller the total hydrate surface area is), the longer it will take for the hydrate to dissociate. A dissociation period that is excessively long is undesirable, however, because it will slow the rate at which water is processed through the apparatus by too much. (One possible way to address that drawback would be to transfer the hydrate to a separate processing area and crush it to increase the surface area and expedite dissociation.) Additionally, if the hydrate masses are too large, they can choke off flow through the system if enough of them accumulate and pack together, with virtually no fluid between them. Thus, it is contemplated that the optimal size of the hydrate masses will be on the order of about half a centimeter across to up to about ten centimeters across.

Because the hydrate-forming substance dissolving device 36 is located at what may be termed a substantially upstream location, i.e., at a pressure depth that is above the pressure depth 16 below which hydrate forms and remains stable, hydrate will not form in the dissolving device 36 or the associated water lines. Therefore, the hydrate-forming substance can be, and preferably is, injected into and mixed with the water to be treated that is flowing through the substantially upstream dissolving device 36 in a relatively robust, energetic manner. Thus, the hydrate-forming substance can be injected using frits, jet nozzles, or eductors to do so, or it may be entrained into solution by flowing the water to be treated through a throttle or venturi-type constriction. The injection should be turbulent so as to promote mixing and rapid dissolving of the hydrate-forming substance into the water to be treated, preferably to the point of saturation or even supersaturation. In order to facilitate dissolving the hydrate-forming substance into the water to be treated to the desired levels or concentrations, and/or to accommodate the desired flow rate of the water to be treated, the substantially upstream hydrate-forming substance dissolving device 36 may be constructed with multiple flow passages and/or with a winding or serpentine flow pathway or pathways through it.

Because, in general, the saturation point for a gas being dissolved into a liquid increases with pressure, more hydrate-forming substance can be dissolved into the water to be treated at lower (i.e., deeper) depths than can be dissolved into the water to be treated at higher (i.e., shallower) depths. Therefore, even if hydrate-forming substance is dissolved into the water to be treated to the point of saturation or supersaturation in the substantially upstream hydrate-forming substance dissolving device 36, even more hydrate-forming substance can be dissolved into the water to be treated by the time it reaches the hydrate-forming substance dissolving device 38, which is at a significantly greater depth and at a correspondingly greater pressure. In other words, as it flows deeper, the water to be treated that has been enriched in hydrate-forming substance in the substantially upstream hydrate-forming substance dissolving device 36 will become undersaturated as pressure increases. (The same saturation level effect and associated operating procedure or protocol will apply in an artificially pressurized hydrate-forming apparatus where multi-stage pressurization and multi-stage gas infusion are employed.)

As shown in FIG. 1, the hydrate-forming substance dissolving device 38 is located at a "somewhat upstream" location. The somewhat upstream location can be any depth down to just above the depth of the shallowest co-located gas infusion point (described in greater detail below). The distance between the substantially upstream location and the somewhat upstream location will vary from system to system, depending on the specific hydrate-forming gas or gas mixture used and the temperature of the input water. The somewhat upstream location will, however, be below the pressure depth 16, which forms the upper bound of the hydrate stability pressure zone. Therefore, hydrate can form and will remain stable if formed within the hydrate-forming substance dissolving device 38 (or, for that matter, anywhere below the pressure depth 16). Accordingly, care must be taken to dissolve the hydrate-forming substance into the water to be treated in dissolving device 38 in a relatively careful, gentle manner so as to avoid initiating hydrate nucleation, which can block flow through the system if formed in the dissolving device 38. Moreover, for the same reason (i.e., to avoid initiating hydrate nucleation), care is taken not to dissolve the hydrate-forming substance into the water to be treated to the point of saturation. Again, as explained above with reference to FIG. 2, hydrate nucleation and growth is energy-dependent, so by limiting the amount of energy imparted to the system, hydrate formation can be avoided.

Toward that end, the hydrate-forming substance preferably is dissolved into the water to be treated by being infused into it on a molecular basis. This may be accomplished using gas infusion membranes 50 (FIG. 3), which have very fine pores through which gas molecules can pass on a molecular basis, i.e., as single molecules rather than in amalgamated form (e.g., as a bubble).

Membranes that can be used to directly dissolve gas into a liquid (or to remove dissolved gas from a liquid) are specially designed and manufactured by only a few companies. One of the best known in the United States is Celgard Inc., 13800 South Lakes Drive, Charlotte, N.C. 28273, which manufactures Celgard microporous polypropylene fiber. The Mitsubishi company of Japan also manufactures membranes of this type as one of its various membrane products. Other manufactures can produce and provide membranes mainly for special research purposes. For instance, the Fraunhofer Institute for Interfacial Engineering and Biotechnology IGB, at Nobelstr. 12, D-70569 Stuttgar, Germany, is known for their research into the direct dissolving of various gases through membranes.

In manufacturing membranes of the sort useful here, referred to in the membrane industry as "hollow fiber membranes," a polymer (e.g. polypropylene) is melted and extruded into small tubes. Pores are then created in the tubes' membrane walls by a variety of processes, including stretching. The microporous fiber typically has pore sizes around 0.03 $\mu$m, with from 25% to 40% porosity, an inner diameter around 200 $\mu$m, and an outer diameter of around 300 $\mu$m.

A key property of these microporous membranes is that they are hydrophobic; therefore, water will not pass through the membrane walls. In the case of gas transfer to or from a liquid, the liquid flows around the outside of the fiber while a gas that is at either a higher or a lower pressure than is found in the surrounding field is introduced inside the hollow fiber, and gas transfer occurs at the previously created pores. At the membrane micropores, liquids and gases can be brought into direct contact with each other without mixing. The membrane provides a support medium which allows a gas and a liquid phase to come into direct contact, but without dispersion at the pore. The gas does not actually go through the pores; rather, it dissolves into the water at the pores. The pores are small enough to prevent the water from flowing or seeping though to the inside of the fiber (due to the surface tension of the water). Therefore, the specific pore size relates more to or is more a function of properties of the water than of the gas.

Figure 3:
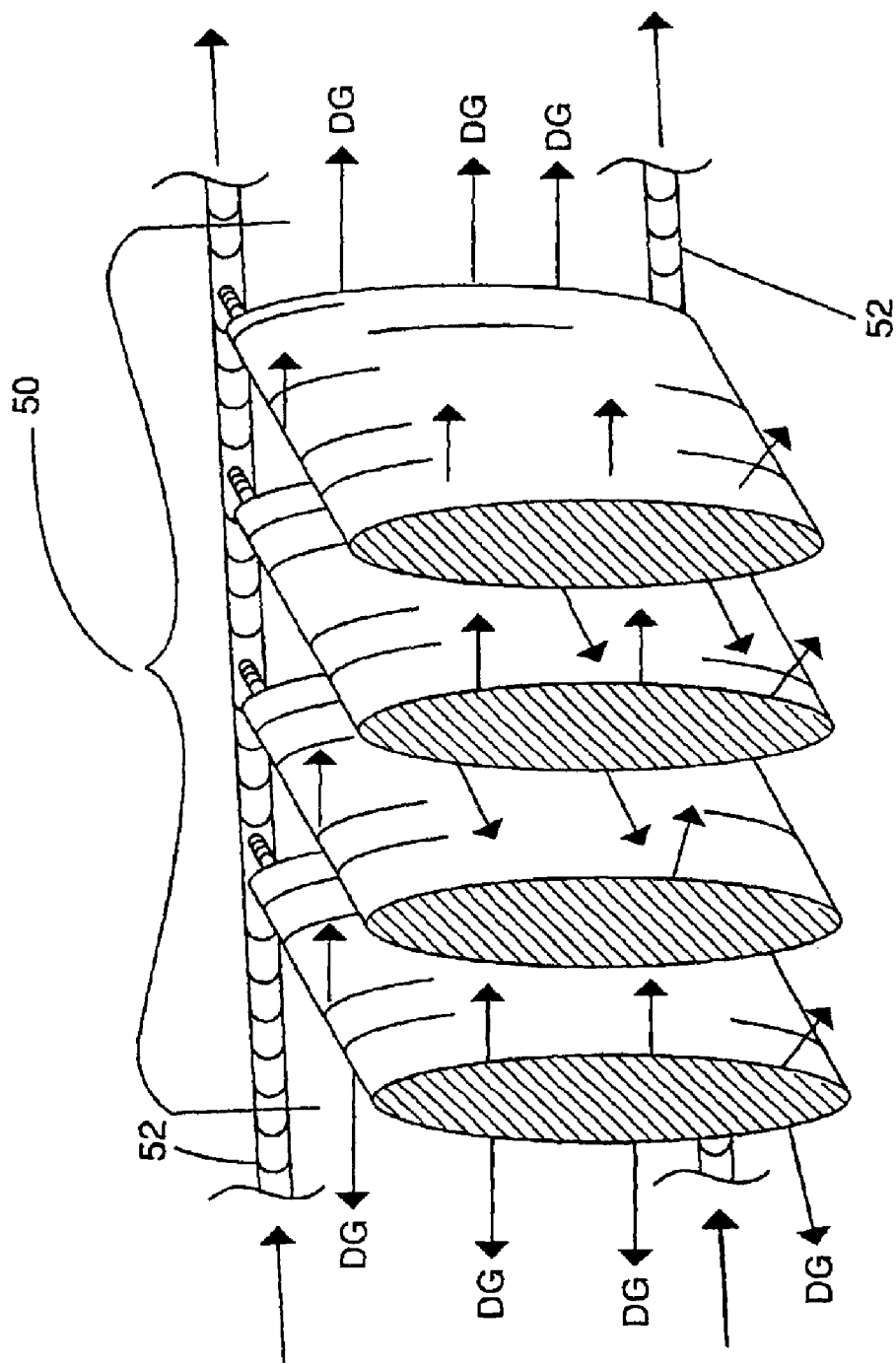
FIG. 3 is a schematic perspective view, in section, illustrating gas infusion membranes used as a "somewhat upstream" hydrate-forming substance dissolving device as illustrated in FIG. 1.

As illustrated in FIG. 3, infusion membranes 50 are supported on rigid or semi-rigid frames (not shown) and define internal pockets or cavities into which hydrate-forming substance is pumped or forced. The infusion membranes 50 and their supporting frameworks are supported by infusion membrane feeder conduits 52 (simplified upper and lower conduits shown in FIG. 3), which branch off from upper and lower hydrate-forming substance feeder lines 44, respectively. As water to be treated flows through the somewhat upstream hydrate-forming substance dissolving device 38, hydrate-forming substance that is pumped or forced into the internal pockets or cavities formed by the infusion membranes 50 will pass through the infusion membranes 50 and into solution in the water to be treated in an osmotic fashion. The surrounding water will thus become enriched in dissolved gas DG.

Although the hydrate-forming substance dissolving devices 36 and 38 are illustrated in FIG. 1 as completely separate, discrete devices, and although the mode of dissolving the hydrate-forming substance has been described as different in nature between the two, it is also contemplated that a single, more integral hydrate-forming substance dissolving device can be provided, with an upper portion of such integral device being disposed above the pressure depth 16 below which hydrate forms and remains stable and a lower portion being disposed below that pressure depth 16. Such an arrangement would provide greater flexibility in terms of how the hydrate-forming substance is dissolved into the water to be treated and may provide finer control over the process because the process would be distributed along the length of the integral device, as illustrated by the dashed lines in FIG. 1, thus providing greater opportunity for system control. Although the device would be integral, the mode of injection and dissolving may vary with position, but it is also further contemplated that the dissolving mechanism might constitute infusion membranes along the entire length of the integral hydrate-forming substance dissolving device. In that case, the increased length of an integral device would provide enhanced opportunity to saturate the water to be treated with the hydrate-forming substance.

Figure 4:
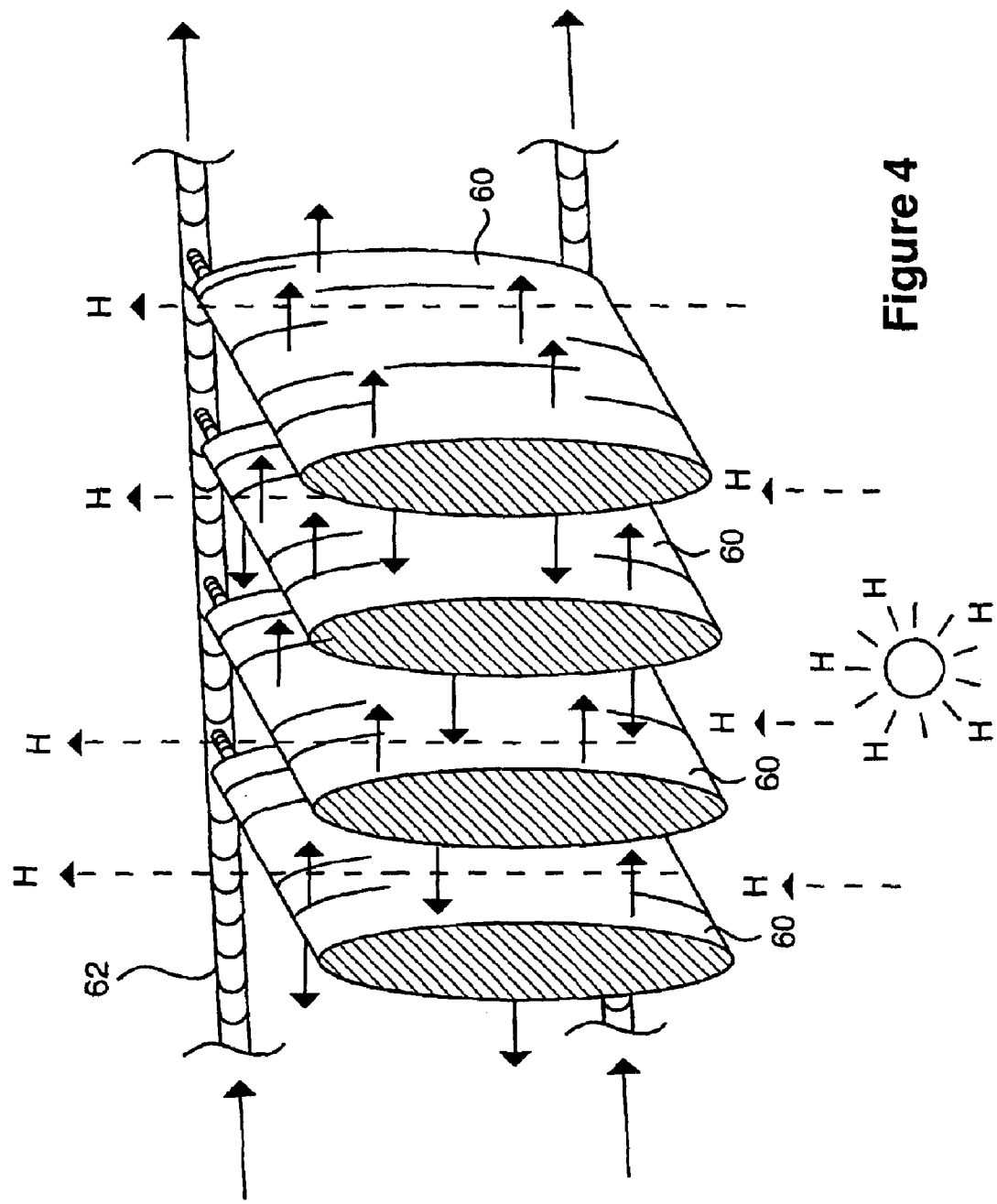
FIG. 4 is a schematic perspective view, in section, illustrating gas infusion membranes used in a "co-located" hydrate-forming substance dissolving device as illustrated in FIG. 1.

In addition to the substantially upstream and somewhat upstream hydrate-forming substance dissolving devices 36 and 38, the apparatus preferably also includes a "co-located" hydrate-forming substance dissolving device 40 that is located directly in the hydrate-forming region 12, as illustrated in FIGS. 1 and 4. The co-located hydrate-forming substance dissolving device 40 preferably includes a number of "banks" of gas infusion membranes 60, which are generally the same as the gas infusion membranes 50 used in the somewhat upstream hydrate-forming substance dissolving device 38. Similarly, the gas infusion membranes 60 are supported on rigid or semi-rigid frameworks (not shown) to form cavities or pockets into which hydrate-forming substance flows through upper and lower infusion membrane feeder conduits 62, which branch off from hydrate-forming substance feeder line 46, respectively. Preferably, the multiple banks of infusion membranes 60 are deployed in a vertical arrangement so that hydrate-forming gas is infused into the water to be treated at multiple levels, as suggested by the plurality of dashed arrows 64 (FIG. 1) at various depths.

Although the gas infusion membranes 60 are illustrated in FIG. 4 as being fed directly from feeder lines 46 by means of infusion membrane feeder conduits 62, and feeder lines 46 are illustrated in FIG. 1 as the primary lines branching off from the hydrate-forming substance input conduit that are used to deliver hydrate-forming substance to the co-located hydrate-forming substance dissolution device 40, it is also contemplated that the hydrate-forming substance feeder lines 46 can terminate at and empty into a large plenum or manifold, with the infusion membrane feeder conduits 62 (FIG. 4) receiving their supplies of hydrate-forming substance from such plenum or manifold. Such a plenum-based or manifold-based construction is suggested by the rectangular depiction of the dissolving device 40 in FIG. 1.

Furthermore, although the co-located hydrate-forming substance dissolving device 40 is shown in FIG. 1 toward one side of the hydrate formation region 12, it may be preferable for the dissolving device 40 to be constructed so that gas infusion membranes 60 are disposed throughout the entire cross-sectional area of the hydrate formation region 12 to ensure maximum exposure of hydrate 8 to dissolved hydrate-forming substance as the hydrate rises within the hydrate formation region 12 and passes between the various gas infusion membranes 60, as illustrated in FIG. 4.

Membranes (not shown) may also be located within the brine removal conduit 34 to recover dissolved hydrate-forming substance contained within the residual brines, i.e., that has not participated in hydrate formation. Removing dissolved gas from the brines via the membranes (in contrast to infusing or dissolving gas into the water to be treated) entails maintaining within the pocket or chamber inside the membrane structure pressure that is less than ambient water pressure, thus causing gas dissolved in the surrounding water to come out of solution and pass into the gas space within the membrane structure. Recovered hydrate-forming substance can then be reused, thus minimizing system waste and reducing the impact of hydrate-forming substance on the surrounding environment.

It should be recognized that the specific design of a hydrate-based desalination installation for practicing the present invention will vary depending on a number of variables, including in particular the temperature of the water to be treated—both in terms of the temperature it is at when it is first obtained as well as the temperature to which it is to be cooled by the time it is introduced into the hydrate-formation region 12—and the particular hydrate-forming substance or mixture of substances that is used. The depth to which the shaft 14 extends will be based in part on the pressure required for hydrate of the particular hydrate-forming substance(s) being used to form and whether the required pressure will be produced by the weight of the column of water in the shaft 14 alone or by augmentation by means of mechanical pressurization. Moreover, the vertical extent over which hydrate-forming substance is infused into the water to be treated in the hydrate formation region 12 (i.e., by means of the co-located hydrate-forming substance dissolving device 40) will depend in large part on the dynamics of formation of hydrate (e.g., hydrate mass accumulation rate or diametric growth rate for a given combination of pressure, temperature, and hydrate-forming substance(s)), as well as with the specific composition of the water to be treated. Accordingly, some amount of experimentation may be desired or necessary in order to optimize the size of the hydrate-masses that can be achieved by utilizing the method and apparatus of the present invention, with such optimization taking account of the considerations addressed above. Such optimizing experimentation should, however, be well within the realm of ability of one having skill in this field and, it is believed, should not be undue or excessive in nature.

Hydrate Effect on Gas Solubility

It is suggested in the literature, by Ginsburg and Soloviev (Ginsburg, G. D. & Soloviev, V. A. 1998, "Submarine Gas Hydrates," VNIIOkeanogeologia, St. Petersburg, Russia (ISBN 5-88994-031-9 [1994]), that solid masses of hydrate are most likely associated when alteration of conditions within a field of hydrate stability causes a decrease of gas solubility in the pore water of a marine sediment in which hydrate naturally occurs. Although alteration of pressure, temperature, salinity, etc., have relatively well known and predictable effects on the level of solubility of a hydrate-forming gas in pore water, my colleagues and I have determined that the presence of hydrate has a more subtle effect on the rapid formation of hydrate, even where the water in which the hydrate is forming may be undersaturated.

Subramanian and Sloan have reported (Subramanian, S. and Sloan, E. D. 2002. "Solubility Effects on Growth and Dissolution of Methane Hydrate Needles", Proceedings of the Fourth International Conference on Gas Hydrates, Yokohama, May 19–23, 2002) that they have observed in experiments the growth of hydrate crystals into saturated water from a nucleation site near a water/gas interface. During growth of the hydrate crystals, the solubility of gas dissolved in the water in the immediate presence of the hydrate crystals appears to be much lower than would be expected if the hydrate were not present. Subramanian and Sloan have proposed that the difference between actual and expected solubility levels, where the presence of solid hydrate influences solubility of the hydrate-forming gas in the surrounding water, is the fundamental driving mechanism for hydrate growth. Kashchiev and Firoozabadi also have suggested (Kashchiev, D. and Firoozabadi, A. 2002, "Driving Force for the Crystallization of Gas Hydrate," Journal of Crystal Growth, 241, 220–230) that hydrate crystal growth is governed by the difference in chemical potential between the aqueous solution and the hydrate crystal.

Thus, it would appear that where pore water in a water/gas system is brought into the presence of hydrate, or where hydrate is nucleated, the solubility of hydrate-forming material (e.g., methane) in the water in contact with hydrate decreases, and the water becomes supersaturated with the hydrate-forming material. Thus, the interfacial water has a high potential to provide hydrate-forming gas to the existing hydrate, which causes the hydrate-forming gas to come out of solution and accelerate the growth of additional hydrate. The interfacial water then tends to equilibrate to a lower gas concentration, which creates a concentration gradient between the interfacial water, which is in equilibrium with the hydrate, and the bulk or surrounding water. The concentration gradient causes dissolved gas molecules to diffuse from the bulk water into the lower-concentration interfacial water and then "down" the concentration gradient toward the hydrate. Accelerated hydrate growth from gas-saturated water will continue so long as there is an abundant supply of reactant available to be drawn from the gas-saturated water.

It is well known and understood that the solubility of gas (e.g., methane) in water changes when either pressure or temperature is altered. (Salinity and a number of other factors found in the natural environment can slightly alter the position of the equilibrium path, but the trend of the phase boundary remains the same with varying pressure or temperature.) The presence of hydrate, however, significantly alters the gas solubility trends in water associated with pressure and temperature changes.

In particular, experiments with methane hydrate present revealed an opposite trend, with methane solubility decreasing significantly with decreasing temperature in a virtually isobaric environment (Subramanian, S. and Sloan, E. D. 2002, "Solubility Effects on Growth and Dissolution of Methane Hydrate Needles," Proceedings of the Fourth International Conference on Gas Hydrates, Yokohama, May 19–23, 2002.). Calculations by Handa (Handa, Y. P. 1990, "Effect of Hydrostatic Pressure and Salinity on the Stability of Gas Hydrates," Journal of Physical Chemistry 94, 2652–2657.) also show an opposite trend, with methane solubility decreasing slightly with increasing pressure and constant temperature when hydrate was present. However, the theoretical model of Kashchiev and Firoozabadi (Kashchiev, D. and Firoozabadi, A. 2002, "Driving Force for the Crystallization of Gas Hydrate," Journal of Crystal Growth, 241, 220–230.) shows methane solubility increasing slightly with increasing pressure in the presence of methane hydrate. Although there is a slight discrepancy between these two models in that regard, it is clear that a temperature change in the presence of hydrate has a substantial effect on methane solubility, whereas a pressure change in the presence of methane hydrate has a comparatively smaller effect on methane solubility.

Figure 5:
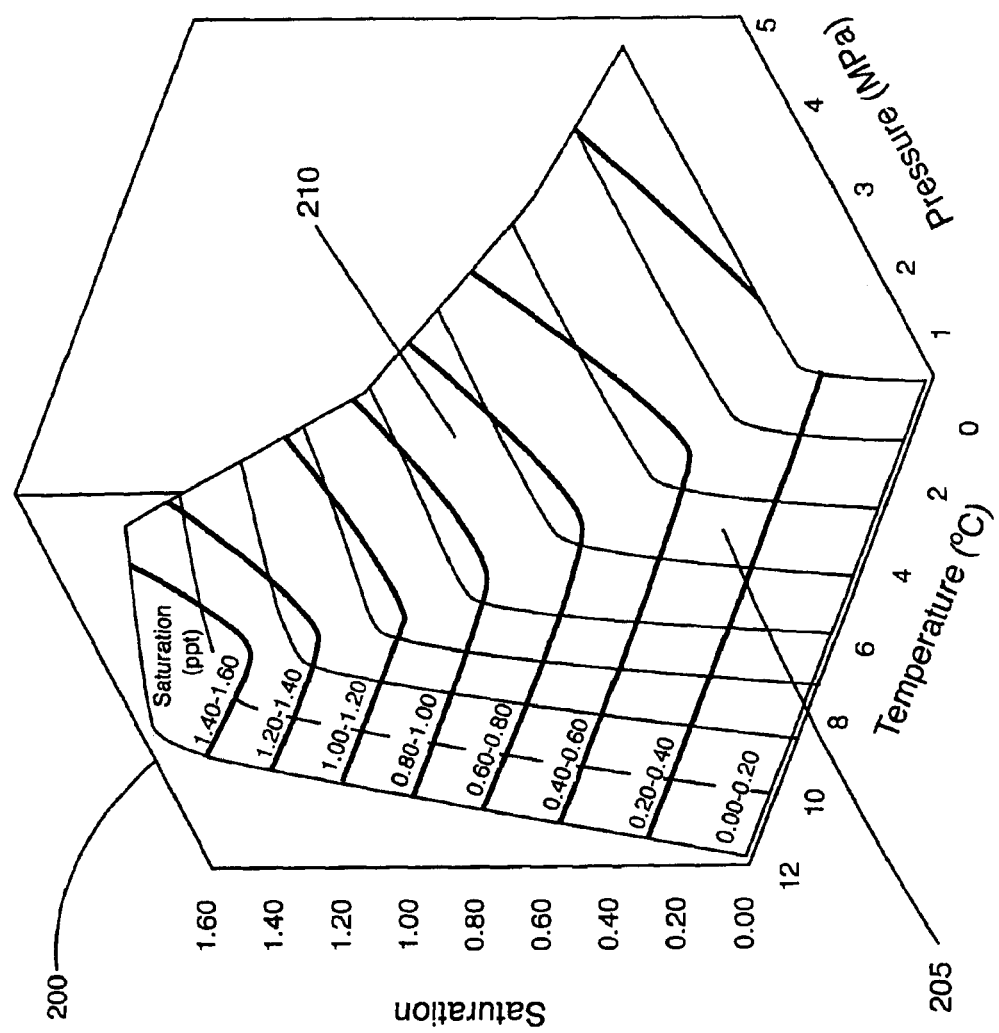
FIG. 5 is a representation in pressure-temperature space of the saturation point of a hydrate-forming gas (ethane), illustrating the effect of the presence of hydrate on solubility and saturation levels.

The solubility of ethane, which is taken as a good example of a common hydrate-forming gas that forms hydrate at lower pressures than methane, is illustrated graphically in three-dimensional pressure-temperature space 200 in FIG. 5. (FIG. 5 is based on analytical models that have been developed for Marine Desalination Systems, LLC, the assignee of this application, to model dissolution and saturation of hydrate-forming gases and hydrate growth rates, among other behaviors and phenomena.) The effect of the presence of hydrate on solubility for the system water, ethane, and hydrate can be seen in region 205, where solubility increases until hydrate is formed. Where hydrate is present, the decreased ethane solubility is illustrated by a "limiting surface" 210, where the solubility of gas in the three-phase system is limited by the transfer of gas molecules from the interface water into growing hydrate. The decrease in ethane solubility within the transitional zone, from some distance away from the hydrate where the presence of hydrate shows no effect toward the hydrate, is just perceptible as a "rotation" of the otherwise essentially planar water solubility surface 205 toward face 210, where the maximum solubility is controlled or governed by hydrate encapsulating "excess" gas within the system water. This transitional zone of variable solubility is not well known with respect to the actual width of the zone, the characteristics of diffusion of gas across the zone, or its kinetics, and colleagues of mine and I are presently conducting fundamental or basic research to establish these properties.

This only recently known attribute of the gas hydrate system is important to the growth of hydrate on small amounts of existing hydrate, which is the primary reason as much hydrate-forming reactant is dissolved into the water to be treated as possible. When the enriched water is brought into the vicinity of hydrate, the solubility drops, the water becomes saturated, and the tendency of the dissolved gas to become involved in the growth of hydrate is strongly augmented.

With respect to the present invention, hydrate-forming material may be dissolved in water in the immediate vicinity of the hydrate formation region, where pressure is suitable for the spontaneous formation of hydrate, without causing the nucleation of small, unwanted hydrate crystals. Because hydrate usually requires water to be saturated before it nucleates (and, for instance, grows hydrate shells on gas bubbles, which have provided dissolved gas into the water), a condition exists where hydrate-forming gas may be dissolved into water to be treated so that levels of saturation necessary for the nucleation of hydrate is not reached. When this "enriched" water is then brought into the immediate vicinity of the hydrate, solubility of the hydrate-forming gas falls, and the water to be treated within the transitional solubility zone in the immediate vicinity of the hydrate reaches saturation and provides reactants to the growing hydrate. A diffusion gradient inward from the enriched water that ranges from the outer margin of the transitional solubility zone to the hydrate (whose precise characteristics depend mainly on pressure, temperature, the impetus for hydrate to grow that can be described as the total free energy available at the growing margin of the hydrate, and the supply of reactants) is created and can be maintained so long as enriched water is circulated within the system as a whole so that dissolved hydrate forming material is available in abundance in the enriched water to be treated.

The foregoing illustration of embodiments of the invention and discussion of underlying theory are intended to be illustrative in nature. Modifications to and departures from the illustrated and described embodiments will occur to those having skill in the art. For example, although the method of the invention has been illustrated in connection with hydrate-based desalination using positively buoyant hydrate in an in-land shaft-based apparatus, the method of the invention may also be capitalized on in connection with negatively buoyant hydrate and/or in a pressurized-vessel-based desalination apparatus. Such modifications to and/or departures from the illustrated embodiments are deemed to be within the scope of the following claims.

I claim:

1. A method for desalinating or purifying saline or otherwise polluted water to be treated using hydrate to do so, including 1) actively or directly forming hydrate of a hydrate-forming substance in a hydrate formation region of a desalination or purification installation under pressure and temperature conditions conducive to formation of said hydrate; and then 2) dissociating said hydrate to release and recover from said hydrate fresh water that has been extracted from said water to be treated, said method comprising:

dissolving hydrate-forming substance into said water to be treated in a manner which does not cause hydrate to form so as to form water to be treated that is enriched in hydrate-forming substance;

forming masses of hydrate of said hydrate-forming substance in said hydrate formation region;

exposing said masses of hydrate to said enriched water to be treated; and allowing said masses of hydrate to grow outwardly into the surrounding water to be treated by incorporating into the hydrate structure, from the water to be treated, fresh water and molecules of said hydrate-forming substance that have been dissolved into said water to be treated.

2. The method of claim 1, wherein hydrate-forming substance is dissolved into said water to be treated at a substantially upstream location relative to said hydrate formation region under conditions not suitable to formation of hydrate such that hydrate does not form upon dissolution of hydrate-forming substance into said water to be treated at said substantially upstream location.

3. The method of claim 2, wherein hydrate-forming substance is dissolved into said water to be treated to the point of saturation or supersaturation at the pressure and temperature conditions extant at said substantially upstream location.

4. The method of claim 2, wherein hydrate-forming substance is caused to be dissolved into said water to be treated at said substantially upstream location by being mixed with said water to be treated in a relatively energetic manner.

5. The method of claim 4, wherein hydrate-forming substance is mixed with said water to be treated by one or more means selected from the group consisting of frits, nozzles, eductors, and venturis.

6. The method of claim 1, wherein hydrate-forming substance is dissolved into said water to be treated at a somewhat upstream location relative to said hydrate formation region under conditions that are suitable for hydrate to form, with dissolution of said hydrate-forming substance into said water to be treated being controlled such that hydrate does not form at said somewhat upstream location.

7. The method of claim 6, wherein hydrate-forming substance is dissolved into said water to be treated at said somewhat upstream location to a concentration that is less than the point of saturation at the pressure and temperature conditions extant at said somewhat upstream location.

8. The method of claim 6, wherein hydrate-forming substance is dissolved into said water to be treated at said somewhat upstream location in a relatively gentle manner so as to avoid forming hydrate.

9. The method of claim 8, wherein hydrate-forming substance is infused into said water to be treated at said somewhat upstream location on a molecular basis.

10. The method of claim 9, wherein said hydrate-forming substance is infused into said water to be treated at said somewhat upstream location using infusion membranes.

11. The method of claim 1, wherein hydrate-forming substance is dissolved into said water to be treated at a co-located location that is approximately right at the hydrate formation region or slightly below it, with dissolving of said hydrate-forming substance into said water to be treated being controlled such that said dissolving, per se, does not initiate hydrate nucleation.

12. The method of claim 11, wherein hydrate-forming substance is dissolved into said water to be treated at said co-located location to a concentration that is less than the point of saturation at the pressure and temperature conditions extant at said co-located location.

13. The method of claim 11, wherein hydrate-forming substance is dissolved into said water to be treated at said co-located location in a relatively gentle manner so as to avoid forming hydrate by said dissolving, per se.

14. The method of claim 13, wherein hydrate-forming substance is infused into said water to be treated at said co-located location on a molecular basis.

15. The method of claim 14, wherein said hydrate-forming substance is infused into said water to be treated at said co-located location using infusion membranes.

16. The method of claim 1, wherein hydrate-forming substance is dissolved into the water to be treated 1) at a substantially upstream location relative to said hydrate formation region under conditions not suitable to formation of hydrate such that hydrate does not form upon dissolution of hydrate-forming substance into said water to be treated at said substantially upstream location; and 2) at at least one of (a) a somewhat upstream location relative to said hydrate formation region under conditions that are suitable for hydrate to form, with dissolution of said hydrate-forming substance into said water to be treated being controlled such that hydrate does not form at said somewhat upstream location and (b) a co-located location that is approximately right at the hydrate formation region or slightly below it, with dissolving of said hydrate-forming substance into said water to be treated being controlled such that said dissolving, per se, does not initiate hydrate nucleation.

17. The method of claim 16, wherein hydrate-forming substance is dissolved into said water to be treated at each of said substantially upstream, somewhat upstream, and co-located locations.

18. The method of claim 1, wherein said method is practiced in an installation comprising an in-land shaft extending deep enough into the ground for the weight of a column of water in the shaft to generate the pressure conditions conductive to formation of hydrate.

19. The method of claim 1, wherein said method is practiced using positively buoyant hydrate.

20. The method of claim 1, wherein said masses of hydrate are positively buoyant and wherein flow through said desalination or purification installation is controlled such that residual brine is flushed generally downward and out of said installation, thereby removing heat of exothermic formation of hydrate from said installation.

21. The method of claim 1, wherein said enriched water to be treated is introduced into said hydrate formation region at a water introduction location; wherein said hydrate masses are initially formed at a hydrate formation location; and wherein said water introduction location is positioned relative to said hydrate formation location such that said enriched water to be treated and said hydrate masses move through said hydrate formation region in opposite, counter-flow fashion.

22. An installation for desalinating or purifying saline or otherwise polluted water to be treated using hydrate to do so by 1) actively or directly forming hydrate of a hydrate-forming substance in a hydrate formation region of said installation under pressure and temperature conditions conducive to formation of said hydrate; and then 2) dissociating said hydrate to release and recover from said hydrate fresh water that has been extracted from said water to be treated, said installation comprising:

a hydrate formation region configured to receive water to be treated under pressure conditions suitable for forming hydrate of said hydrate-forming substance;

a substantially upstream hydrate-forming substance dissolving device that is disposed relative to said hydrate formation region at a substantially upstream location where pressure conditions are not suitable for hydrate of said hydrate-forming substance to form; and at least one of (a) a somewhat upstream hydrate-forming substance dissolving device that is disposed relative to said hydrate formation region at a somewhat upstream location where pressure conditions are suitable for hydrate of said hydrate-forming substance to form and (b) a co-located hydrate-forming substance dissolving device that is disposed at a co-located location approximately right at the hydrate formation region or slightly below it.

23. The installation of claim 22, wherein said installation includes hydrate-forming devices at each of said substantially upstream, somewhat upstream, and co-located locations.

24. The installation of claim 22, wherein said substantially upstream hydrate-forming substance dissolving device comprises one or more means selected from the group consisting of frits, nozzles, eductors, and venturis.

25. The installation of claim 22, wherein said somewhat upstream hydrate-forming substance dissolving device comprises infusion membranes.

26. The installation of claim 22, wherein said co-located hydrate-forming substance dissolving device comprises infusion membranes.

* * * * *